United States Patent [19]

Erisman

[11] Patent Number: 5,406,584
[45] Date of Patent: Apr. 11, 1995

[54] TIME SHIFT KEYING DIGITAL COMMUNICATIONS SYSTEM

[75] Inventor: David E. Erisman, Pocomoke, Md.

[73] Assignee: X-Com, Inc., Salem, Ark.

[21] Appl. No.: 937,740

[22] Filed: Sep. 1, 1992

[51] Int. Cl.$^6$ .......................................... H04L 27/10
[52] U.S. Cl. ...................................... 375/45; 375/62; 375/88; 332/100
[58] Field of Search .................... 375/47, 45, 62, 88, 375/89, 90, 48, 49, 23; 332/100; 329/300

[56] References Cited

U.S. PATENT DOCUMENTS

| | | | |
|---|---|---|---|
| 3,454,718 | 7/1969 | Perreault | 375/45 |
| 3,899,637 | 8/1975 | Willard et al. | 375/49 |
| 4,737,969 | 4/1988 | Steel et al. | 375/67 |
| 4,827,488 | 5/1989 | Shibano | 375/82 |
| 4,905,177 | 2/1990 | Weaver, Jr. et al. | 364/721 |
| 5,105,444 | 8/1992 | Gard | 375/49 |

Primary Examiner—Stephen Chin
Assistant Examiner—T. Ghebretinsae
Attorney, Agent, or Firm—Richard C. Litman

[57] ABSTRACT

A digital modulation technique is disclosed which is unique in that it does not utilize fixed time slots for varying the characteristics of an electromagnetic carrier signal, but actually uses variations of the time slots to transfer the digital information. The modulation is created by using direct digital synthesis techniques to produce a carrier waveform that closely approximates a sine wave carrier signal that can vary the time it takes for each peak to occur. The peaks of the carrier are tightly controlled to occur at exact discrete time slots that correspond to certain base band digital data. The time slot changes occur precisely at the sine wave peaks to minimize the bandwidth requirement and maximize the data rate.

20 Claims, 4 Drawing Sheets

TIME SHIFT KEYING DIGITAL COMMUNICATIONS SYSTEM

BACKGROUND OF THE INVENTION

1. FIELD OF THE INVENTION

The present invention relates to digital communication systems in which the waveform of the electromagnetic carrier signal is varied in accordance with the binary data being transmitted. More particularly, the present invention pertains to a peak to peak data communications scheme in which the distance between two successive peaks, one positive peak and one negative peak, represents the digital data transmitted.

2. DESCRIPTION OF THE PRIOR ART

Digital modulation is the process of transmitting base band digital information over a communications channel by altering certain aspects of a carrier signal. The carrier signal must be altered so that discrete states are created with very little chance for ambiguity between the states. These discrete states correspond to one or more binary bits of data and the resulting modulated carrier is more immune to noise than analog modulated carriers which represent continuous signal transitions with no discrete states.

To get the maximum amount of data over a given digital communications channel, small bandwidths and high bit rates are used. For example, more data can be transmitted over a frequency multiplexed communications channel, such as used in satellite links, when data communication techniques are used which have narrow bandwidth requirements per carrier while still providing high data rates.

Some carrier signals for digital modulation are based on sinusoidal waveforms since they require the least amount of bandwidth of any waveform. The process of altering the characteristics of the sinusoidal waveform for digital modulation is very important considering the high cost of communication channels in use at the present time. Heretofore, digital sinusoidal modulation has been accomplished by three basic means. These three classical forms of digital sinusoidal modulation are amplitude-shift keying (ASK), frequency-shift keying (FSK), and phase-shift keying (PSK) (see FIG. 6). In ASK, the amplitude of the carrier is varied or shifted in response to changes in the digital data. In FSK, the frequency of the carrier is varied or shifted in response to changes in the digital data. In PSK, the phase of the carrier is varied or shifted in response to changes in the digital data.

Each of these three forms of modulation has disadvantages. ASK is especially susceptible to atmospheric noise and fading. FSK requires the receiver to detect two discrete frequencies which takes time since several cycles of each frequency must be received before the frequency can be acquired and detected. PSK requires complex receiver circuitry to detect phase changes and elaborate filtering to control spurious outputs that reduce efficiency.

The three classical forms of sinusoidal digital modulation have one element in common. They use fixed time slots for varying the characteristics of the carrier. These fixed time slots cause the variations in the carrier to occur at random points along the sinusoidal waveform. When these changes to the carrier occur, spurious frequencies are generated that cause the modulation bandwidth to expand requiring complex filtering to reduce the amplitude of the spurious frequencies. As the bit rate increases; these variations in the carrier occur more frequently causing even more spurious output and making demodulation even more difficult.

U.S. Pat. No. 4,737,969 issued Apr. 12, 1988 to Steel et al discloses a digital communications scheme having relatively high bit rates and using digital pulses having a minimal frequency spectrum. U.S. Pat. No. 4,827,488 issued May 2, 1989 to Shibano discloses a digital communications scheme in which a sinusoidal carrier signal is demodulated in a PSK system by controlling the oscillator with a feedback signal derived from the received sinusoidal carrier.

U.S. Pat. No. 4,905,177 issued Feb. 27, 1990 to Weaver, Jr. et al discloses a method of phase modulation using direct digital synthesis circuits to create a phase modulated carrier.

None of the above inventions and patents, taken either singly or in combination, is seen to describe the instant invention as claimed.

SUMMARY OF THE INVENTION

The amount of spurious output generated every time a sinusoid waveform is varied is dependant upon the instantaneous value or slope of the waveform when the change occurs. If the change occurs exactly at the midpoint of the sine wave, the slope value is at its highest and the greatest amount of spurious output is generated.

However, if the change occurs exactly at the peak of the sine wave, the slope value is at its minimum (zero), and the least amount of spurious output is generated. When the digital modulation technique uses fixed time slots for varying the characteristics of the waveform, the changes to the sinusoid waveform will occur at random points with no regard to minimizing spurious outputs.

In the proposed modulation technique of the present invention, the modulation would not use fixed time slots but would actually use variations of the time slots to communicate the digital information. By utilizing the special case of a sine wave peak where the slope is zero, and by varying the time slots to occur at exactly every sine wave peak, both the bit rate and the bandwidth can be greatly improved over conventional modulation techniques. This form of modulation I have designated as time-shift keying (TSK).

Accordingly, it is a principal object of the invention to modulate a sinusoidal carrier by direct digital synthesis techniques utilizing a discrete time shift between each successive carrier half cycle to convey the digital data.

It is another object of the invention to demodulate the modulated data, e.g., the carrier, by detecting the distances between successive positive and negative peaks of the carrier.

It is a further object of the invention to generate a minimum amount of spurious output by shifting states at the sinusoidal peaks where the slope of the carrier is zero.

Still another object of the invention is to provide a data channel with high bit rates of transmitted data by modulating at least one bit between each half cycle of the carrier.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

In TSK, the time slots are not tied to a fixed time standard. The time slots are determined by the peaks of a carrier wave and the carrier peaks are varied to perform the modulation. To minimize the bandwidth requirement, the waveform of the carrier must closely resemble a sine wave. In order to produce this specialized carrier, direct digital synthesis techniques are utilized.

Figure 1:
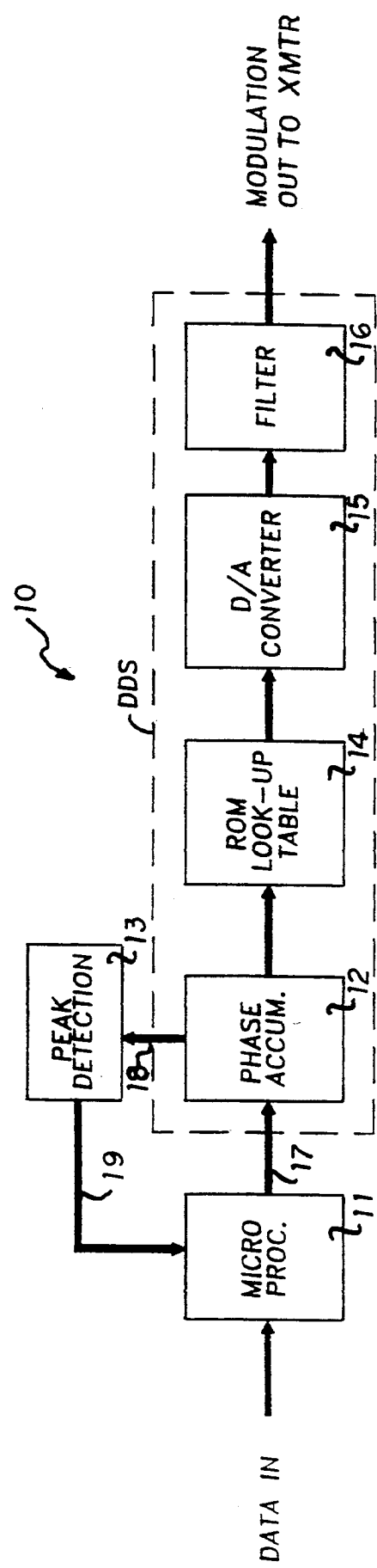
FIG. 1 is a circuit diagram of the modulator circuit of the present invention.

Direct digital synthesis (DDS) is the process of generating a digital representation of the desired waveform using computer logic and then using a digital to analog converter to convert the digital representation into an analog waveform. A block diagram of a conventional DDS circuit is shown in FIG. 1. A phase accumulator 12 is employed to address sine wave amplitude coefficients for successive phase increments that are stored in a read only memory (ROM) look-up table 14. These digital values are sent to a digital to analog (D/A) converter 15 and then filtered by a bandpass filter 16 to produce a very accurate sinusoid waveform.

Figure 2:
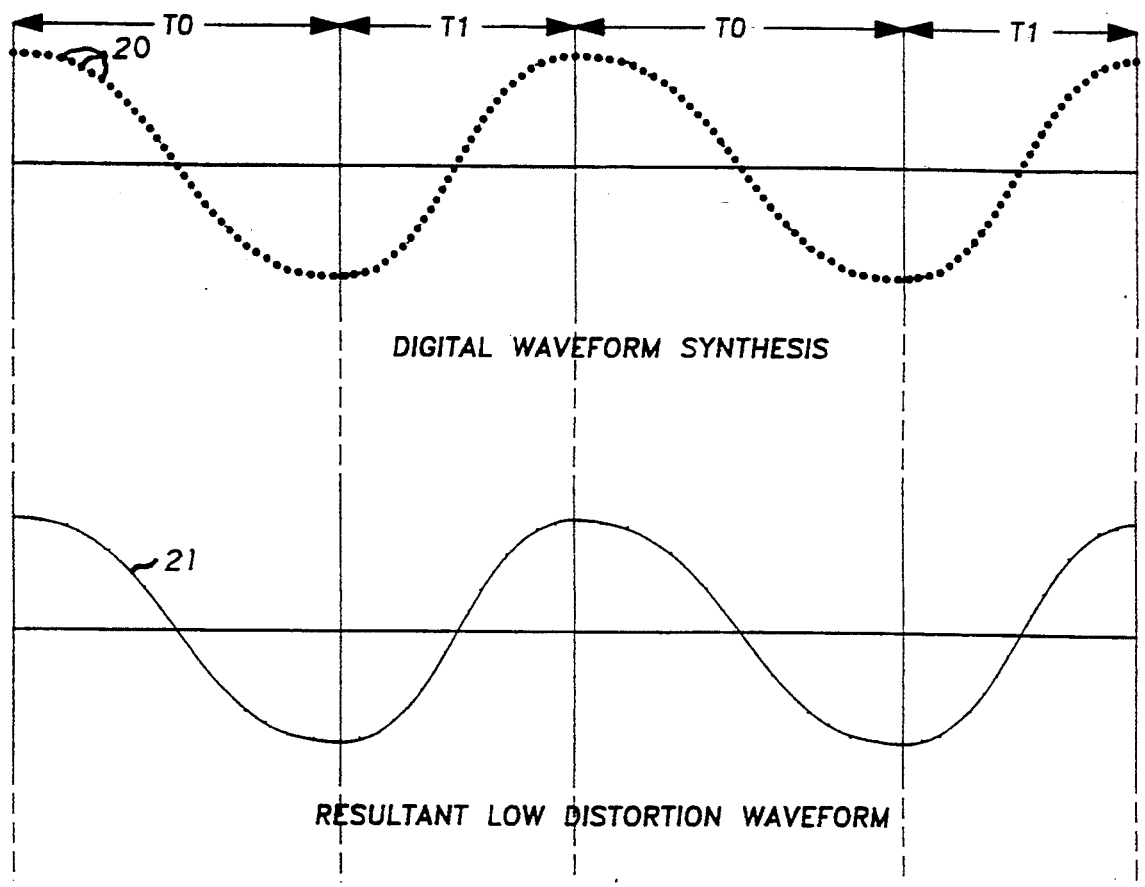
FIG. 2 is a signal diagram illustrating the modulation technique for the present invention.

The modulator circuit 10 for the present invention uses the DDS circuit to modulate a sinewave based upon blocks of digital data fed into the microprocessor 11. The modulation produced by the DDS data results in a low distortion sine wave 21 as illustrated in FIG. 2. This is accomplished under the control the microprocessor controller 11. As data is received by the controller 11, the data is evaluated to determine its contents. Each block of digital data has a predetermined value associated with it. The predetermined value has to be a discrete value which is part of a predetermined number of possibly assigned discrete values. In the preferred embodiment, the predetermined number of possibly assigned discrete values is two, thus the block of digital data is a binary digit.

As the binary digits come into the controller 11 from the data in line, the controller is sending out a signal 17 to the phase accumulator 12. The signal 17 is a numerical value N and is used to indicate to the phase accumulator 12 what the next phase increment will be so that the next selected sine wave amplitude coefficient stored in ROM look-up table 14 to be accessed is the sine wave amplitude coefficient located N increments of phase beyond the phase of the previous sine wave amplitude coefficient retrieved from the ROM look-up table 14. In this manner, the signal 17 informs the phase accumulator 12 how many address locations in the ROM look-up table to skip ahead of in order to retrieve the next sine wave amplitude coefficient. As shown in FIG. 2, the sine wave amplitude coefficients 20 are plotted as a digitally synthesized waveform signal. These coefficients 20 are fed to the D/A converter 15 and then to the filter 16 so as to obtain a resultant low distortion waveform 21 which is the TSK sinusoidal carrier modulation output. This output is then fed to a transmitter for broadcasting over a communications path.

In order to modulate according to the incoming digital blocks of data, the controller 11 can detect when the sine wave peaks will occur by monitoring the signal, 19 from a peak detection circuit 13. The peak detection circuit 13 monitors the address signals 18 from the phase accumulator in order to detect the peaks of the sinusoidal carrier which correspond to the addresses which contain the largest positive and negative sine wave amplitude coefficients stored within the ROM look-up table. Whenever the address signal 18 indicates that the address of the positive or negative peak is being accessed from the ROM look-up table 14, the peak detection circuit 13 will then indicate to the controller 11 that the end of a sinusoidal carrier segment has been reached via signal 19.

When the address containing a sinusoid peak is thus detected, the microprocessor can send a new frequency value to the DDS and thereby lengthen or shorten the time for the next sine wave peak to occur. This is accomplished by varying the value of N. For a given clock cycle, if N were to increase there would be fewer sine wave amplitude coefficients and the frequency of the sinusoidal carrier would increase, thereby decreasing the wavelength and elapsed time of the sinusoidal carrier for that segment. These shifts in the time between sine wave peaks would correspond to different digital base band states.

For example, as shown in FIG. 2, a length of time T0 is used to indicate a digital data block has a value of one (1) for a carrier segment and a length of time T1 is used to indicate a digital data block has a value of zero (0). Direct digital synthesis can be used to produce a sine wave carrier with a high degree of accuracy at frequencies of 10 MHz or more and with time shifts in increments of 50 nanoseconds or less. To produce a bit rate of 100 Kbits/sec, a carrier frequency of approximately 50 KHz is utilized. Therefore, if the clock cycle of the DDS were 20 MHz, and a one (1) was represented by a frequency of forty-eight (48) KHz within a carrier segment, while a frequency of fifty-two KHz within a carrier segment represents a zero (0), there would be 208 sine wave amplitude coefficients 20 accessed from the ROM look-up table 14 for every carrier segment representing a one (1), which would equate to 10.4 μsec of elapsed time for the half cycle carrier segment. There would only be 192 sine wave amplitude coefficients 20 accessed from the ROM look-up table 14 for every carrier segment representing a zero (0), which would equate to 9.6 μsec of elapsed time for the half cycle carrier segment.

As shown in FIG. 2, if the first block of digital data is to be a one (1) followed by a zero (0), followed by another one (1), and then followed by another zero (0), then the first and third carrier segments would have 208 sine wave amplitude coefficients 20 located within them, while the second and fourth carrier segments would have 192 sine wave amplitude coefficients 20 located within them. The controller 11 would send signal 17 having a first value for N in order to produce a phase shift increment of 180/208 degrees for each successive sine wave amplitude coefficient 20 within the first sinusoidal carrier segment. When the peak detection circuit 13 indicates that the next peak has arrived, the controller 11 will send a signal 17 having a second value for N in order to produce a phase shift of 180/192 degrees for each successive sine wave amplitude coefficient 20 within the second sinusoidal carrier segment. The process continues for each segment, thereby producing modulation by time-shifting the sinusoidal carrier.

In the binary case of TSK where two discrete time slots would represent 1 bit of data as set forth above, the sinusoidal carrier could change its characteristics twice per cycle which would give it an efficiency approaching 2 bits/cycle which is at least twice as efficient as binary ASK, FSK, or PSK. As in other forms of digital modulation, even more efficiency could be achieved by using more than two distinct carrier states. By using four discrete time slots, TSK efficiency would approach 4 bits/cycle and eight discrete time slots would allow TSK to achieve an efficiency approaching 6 bits/cycle. TSK could even be combined with ASK to provide even greater efficiencies.

Figure 3:
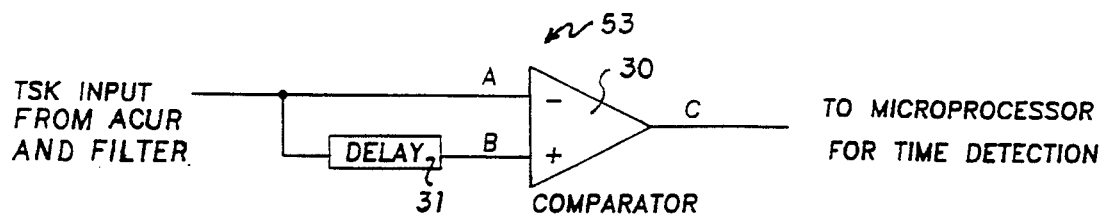
FIG. 3 is a circuit diagram of a portion of the demodulator circuit of the present invention.

Demodulation of TSK to recover the base band digital information would also be accomplished by digital techniques. In order to recover the digital data blocks from the sinusoidal carrier, the peaks of the sinusoidal carrier must detected. To accomplish this a peak detector 53 is shown in FIG. 3. A signal A is produced after the sinusoidal carrier is received and detected. The sinusoidal carrier signal A goes to the, negative input end of an Op-Amp 30 used as a comparator circuit as is known in the prior art. After a small time delay provided by a delay circuit 31, the sinusoid carrier signal B is sent to the positive input of the Op-Amp 30. As is the case with the conventional comparator, when the positive input of the Op-Amp 30 is greater than the negative input, the output of the Op-Amp 30 is pinned to the positive power supply voltage level; otherwise, it is pinned to the negative voltage power supply level.

Figure 4:
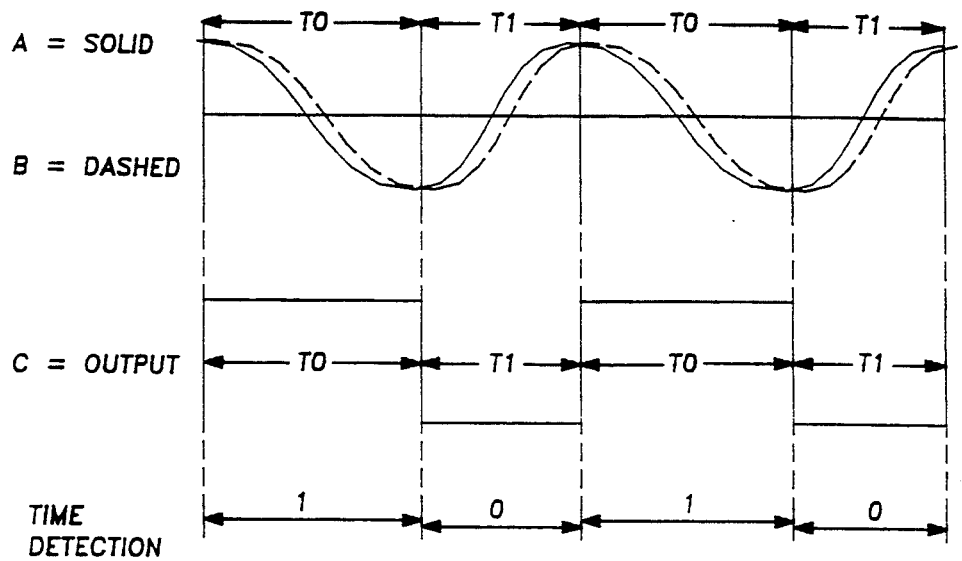
FIG. 4 is a signal diagram illustrating the demodulation technique for the present invention.

As shown in FIG. 4, as the first sinusoidal carrier segment is received by the peak detector 53, since the waveform therein has a negative slope, signal B is greater than signal A and the output signal C is positive during the first sinusoidal carrier segment. For the second carrier segment the waveform has a positive slope, and the signal A is greater than the signal B resulting in a negative value for signal C.

Figure 5:
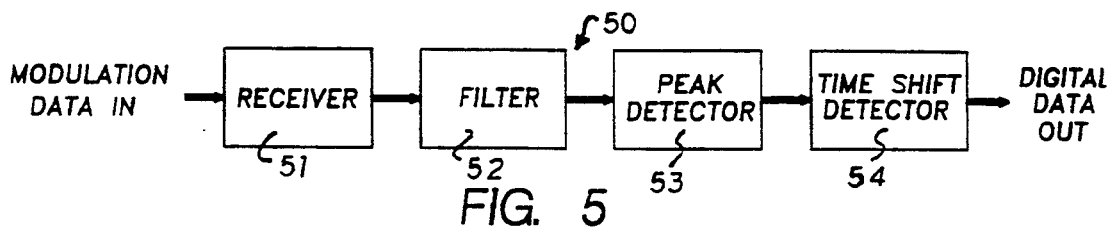
FIG. 5 is a circuit diagram of the demodulator circuit of the present invention.
Figure 6:
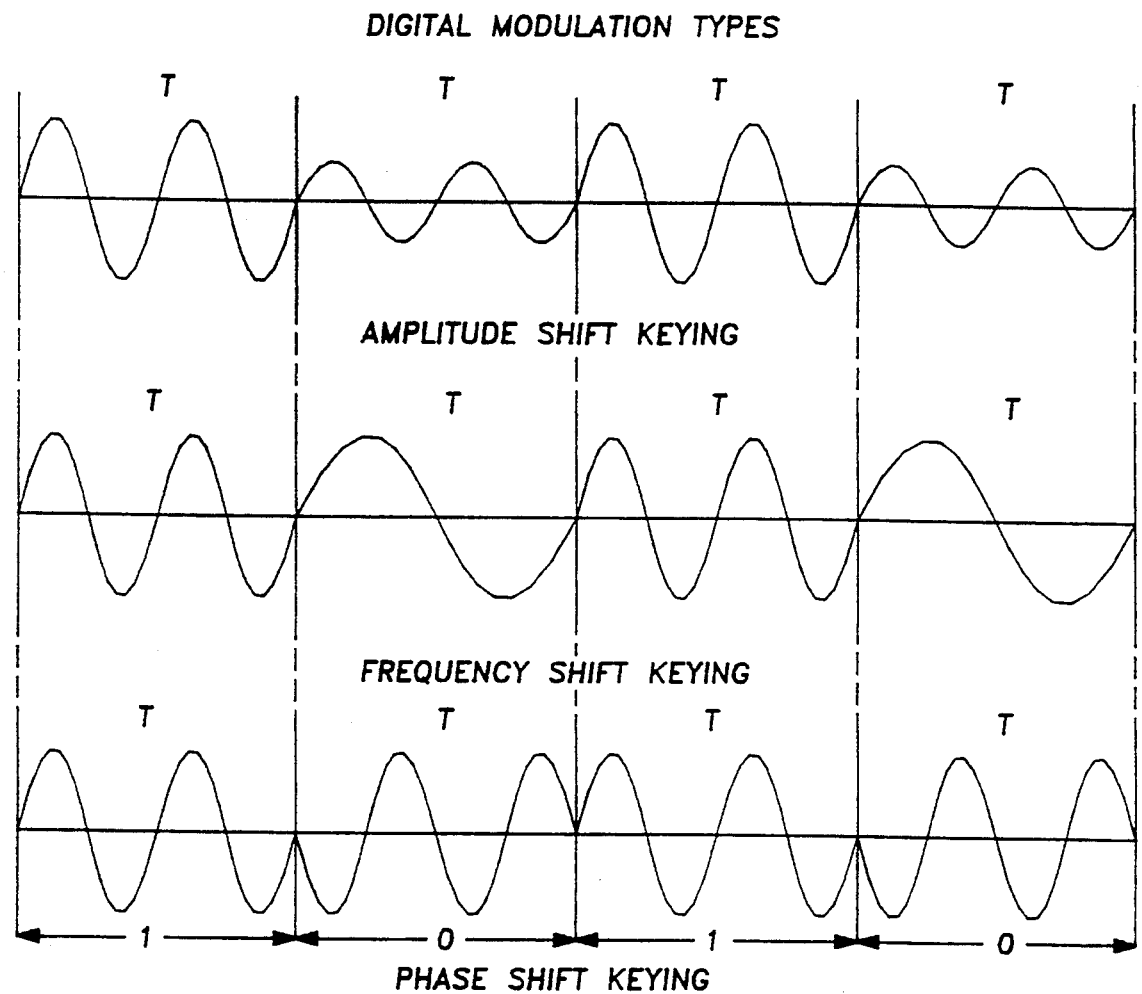
FIG. 6 is a signal diagram of the modulation techniques used in the prior art.

The block diagram of the TSK demodulation circuit 50 is shown in FIG. 5. The TSK carrier would be received by an RF receiver 51 in order to recover the sinusoidal carrier as it was output by the DDS and before it was transmitted by the transmitter. After being detected by the receiver 51, the sinusoidal carrier would then be filtered by a bandpass filter 52 to remove unwanted frequencies and noise. The signal would next go to a peak detector 52 whose output would directly relate to the time between each sine wave peak. A digital microprocessor functions as a time shift detector 54 in order to analyze the output of the peak detector 53, convert the time shifts to digital base band data, and send the digital data to its destination.

It is to be understood that the present invention is not limited to the sole embodiment described above, but includes all variations thereof within the scope of the present invention. For example, the transmitter used could be a radio frequency transmitter which further modulates the output DDS containing the modulated data in order place the modulated data on another carrier, for example in the microwave region. The transmitter could modulate the output of the DDS in order to transmit the modulated data along a fiber optic cable. Any conventional mode of transmission in the art could be used in the present invention. It is also to be understood that the present invention encompasses any and all embodiments within the scope of the following claims.

I claim:

1. A method of modulating a plurality of digital data blocks as carrier segments of a carrier, the method of modulating comprising the steps of:

sequentially receiving the plurality of digital data blocks, wherein each of the plurality of digital data blocks has a predetermined discrete value associated therewith out of a predetermined number of possibly assigned discrete values; and modulating each of the plurality of digital data blocks selecting a time duration for each successive carrier segment located between each successive peak of the carrier from a set of a predetermined number of possibly assigned time durations, each of the predetermined number of possibly assigned time durations being associated with one of the predetermined number of possibly assigned values of the sequentially received plurality of digital data blocks, respectively.

2. The method as claimed in claim 1, further comprising the steps of:

detecting the completion of the carrier segment; and controlling the selection of the time duration when the completion of the carrier segment is detected.

3. The method as claimed in claim 1, wherein the carrier segment is constructed from sine wave amplitude coefficients.

4. The method as claimed in claim 3, further comprising the steps of:

detecting the completion of the carrier segment by monitoring the sine wave amplitude coefficients to determine when the sine wave amplitude coefficient corresponding to one of said successive peaks of the carrier segment is recognized; and controlling the selection of the time duration when the completion of the carrier segment is detected.

5. The method as claimed in claim 1, wherein the carrier includes a cycle comprising two of the carrier segments.

6. A method of transmitting a plurality of digital data blocks along a communications path as sinusoidal carrier segments of a carrier and receiving the carrier from the communications path to recover the plurality of digital data blocks, the method comprising the steps of:

sequentially receiving the plurality of digital data blocks, wherein each of the plurality of digital data blocks has a predetermined discrete value associated therewith out of a predetermined number of discrete values;

modulating each of the plurality of digital data blocks received by selecting a time duration for each successive sinusoidal carrier segment located between each successive peak of the carrier wherein the selected time duration is associated with one of a predetermined number of possibly assigned discrete values of the sequentially received plurality of digital data blocks, respectively, whereby each time duration establishes when a next successive peak of the carrier occurs from a previous peak of the carrier;

transmitting the carrier along the communications path;

detecting the carrier within the communications path transmitted therein in said transmitting step;

measuring the elapsed time between each successive peak of the carrier detected in said detecting step, thereby measuring the time duration of each sinusoidal carrier segment;

determining which one of a predetermined number of discrete frequencies is associated with each time duration of each of the sinusoidal carrier segments as measured in said measuring step;

assigning a respective one of the predetermined number of possibly assigned discrete values to each time duration measured in said measuring step in accordance with the predetermined discrete value associated with the discrete frequency associated with each respective time duration as determined in the determining step; and recovering each of said plurality of digital data blocks by reconstructing each of said plurality of digital data blocks in accordance with the assigned discrete values assigned to each time duration in said assigning step.

7. The method as claimed in claim 6, further including the steps of:

detecting the completion of the carrier segment; and controlling the selection of the time duration when the completion of the carrier segment is detected.

8. The method as claimed in claim 6, wherein the carrier includes a cycle comprising two of the carrier segments.

9. The method as claimed in claim 6, wherein the carrier segment is constructed from sine wave amplitude coefficients.

10. The method as claimed in claim 9, further comprising the steps of:

detecting the completion of the carrier segment by monitoring the sine wave amplitude coefficients to determine when the sine wave amplitude coefficient corresponding to a peak of the carrier segment is recognized; and controlling the selection of the time duration when the completion of the carrier segment is detected.

11. A time shift keying digital communications system for generating a carrier having carrier segments, comprising:

an input data line for sequentially receiving a plurality of digital data blocks, wherein each of said plurality of digital data blocks has a predetermined discrete value associated therewith out of a predetermined number of possibly assigned discrete values;

modulation means, having an input end, a first output end, and a second output end, for constructing said carrier having carrier segments at said first output end in accordance with a control signal received at said input end, each said carrier segment having a time duration selected from a set of predetermined discrete time durations, each one thereof being associated with one of said predetermined number of possibly assigned discrete values of said plurality of digital data blocks;

carrier segment completion detection means for detecting when said modulation means has constructed said carrier segment from one peak thereof to another successive peak thereof, wherein said carrier segment completion detection means is connected to said second output end of said modulation means; and a controller for producing said control signal to select the time duration in accordance with each sequentially received one of said plurality of digital data blocks, said controller having a first input connected to said input data line, a second input connected to said carrier segment completion detection means, and an output connected to said input end of said modulation means.

12. A time shift keying digital communications system as claimed in claim 11, further comprising transmission means for transmitting said carrier from said first output end of said modulation means, along a communication path.

13. A time shift keying digital communications system as claimed in claim 12, further comprising:

a receiver receiving said carrier transmitted along said communications path by said transmission means;

filtering means for filtering noise from said carrier received by said receiver;

peak detection means for detecting the time duration between each successive peak of said carrier filtered by said filtering means; and time shift detector means for detecting the time duration of each carrier segment between each successive peak of said carrier as determined by said peak detection means.

14. A time shift keying digital communications system as claimed in claim 13, wherein said peak detection means includes:

an operational amplifier having a negative input, a positive input, and an output end;

said negative input of said operational amplifier being connected to said filtering means; and a delay circuit having a delay circuit input end connected to said filtering means, said delay circuit having a delay circuit output end connected to said positive input of said operational amplifier.

15. A time shift keying digital communications system as claimed in claim 13, wherein said peak detection means produces a succession of pulses having widths proportional to the time duration of each of the sequentially received plurality of digital data blocks.

16. A time shift keying digital communications system as claimed in claim 11, wherein said modulation means includes:

a phase accumulator circuit connected to controller for accepting said control signal, said phase accumulator circuit producing a succession of phase addresses in accordance with said control signal; and a look-up table connected to said phase accumulator circuit for receiving said succession of phase addresses, said look-up table having sine wave coefficients stored in association with phase address locations, wherein said look-up table produces a succession of sine wave coefficients in response to said succession of phase addresses.

17. A time shift keying digital communications system as claimed in claim 16, wherein said carrier segment completion detection means is coupled to said phase accumulator circuit for receiving said succession of phase addresses.

18. A time shift keying digital communications system as claimed in claim 16, wherein said modulation means further includes:

a digital-to-analog converter having an input connected to said look-up table for converting said succession of sine wave coefficients into analog signals; and a filter for receiving said analog signals from said digital-to-analog converter to obtain a sinusoidal waveform.

19. A time shift keying digital communications system as claimed in claim 11, wherein said carrier includes a cycle comprising two of said carrier segments.

20. A time shift keying digital communications system as claimed in claim 11, wherein said carrier is a sinusoidal waveform.

* * * * *